United States Patent [19]

Werle et al.

[11] Patent Number: 6,060,571
[45] Date of Patent: May 9, 2000

[54] ACROLEIN-RELEASING COPOLYMERS

[75] Inventors: Peter Werle, Gelnhausen; Hans-Peter Krimmer, Dietzenbach; Martin Trageser, Gelnhausen; Franz-Rudolf Kunz, Erlensee, all of Germany

[73] Assignee: Degussa Aktiengesellschaft, Frankfurt, Germany

[21] Appl. No.: 08/804,698

[22] Filed: Feb. 21, 1997

Related U.S. Application Data

[60] Provisional application No. 60/021,828, Jul. 16, 1996.

[30] Foreign Application Priority Data

Feb. 22, 1996 [DE] Germany .......................... 196 06 495
Dec. 20, 1996 [DE] Germany .......................... 196 53 303

[51] Int. Cl.[7] .............................. C08G 2/00; C08F 16/34; C02F 3/32
[52] U.S. Cl. ........................ 526/315; 526/315; 526/909; 528/230; 528/246; 528/270; 528/266; 528/361; 210/732; 210/764; 424/462; 424/334; 524/547; 71/64.11
[58] Field of Search ........................ 526/315; 528/230, 528/361, 270; 210/732, 764; 424/462, 334; 71/64.11; 524/547

[56] References Cited

U.S. PATENT DOCUMENTS

| | | | |
|---|---|---|---|
| 3,635,898 | 1/1972 | Lorenz et al. | 260/67 |
| 3,843,684 | 10/1974 | Randall | 260/326.25 |
| 4,016,127 | 4/1977 | Larsson et al. | 260/26.6 TA |
| 4,375,537 | 3/1983 | Cohen et al. | 528/230 |
| 4,479,820 | 10/1984 | Merk et al. | 71/67 |
| 4,783,336 | 11/1988 | Mergel et al. | 424/462 |
| 5,290,894 | 3/1994 | Melrose et al. | 526/315 |
| 5,843,881 | 2/1997 | Dubois et al. | 512/1 |

FOREIGN PATENT DOCUMENTS

| | | |
|---|---|---|
| 0 339 044 | 2/1994 | European Pat. Off. . |
| 0339044B1 | 2/1994 | European Pat. Off. . |
| 1312166 | 3/1963 | France . |
| 766901 | 8/1944 | Germany . |
| 1047432 | 12/1958 | Germany . |
| 1059662 | 6/1959 | Germany . |
| 3205487C1 | 10/1983 | Germany . |
| 4404404A1 | 8/1995 | Germany . |
| WO/88/04671 | 6/1988 | WIPO . |

OTHER PUBLICATIONS

Ullmann's Encyclopedia of Industrial Chemistry, 5th Ed., 1985, pp. 149–151.

*Primary Examiner*—Bernard Lipman
*Assistant Examiner*—Tanya Zalukaeva
*Attorney, Agent, or Firm*—Pillsbury Madison & Sutro LLP

[57] ABSTRACT

Acrolein polymer from acrolein and one or more polyhydric alcohols, characterized by release of monomeric acrolein in aqueous systems and hence by a prolonged effect on microorganisms, is prepared by adding acrolein to a reaction medium containing catalyst in dissolved form, and not allowing the temperature of the reaction medium to rise about 50° C. The acrolein polymer may be used in aqueous systems as a biocide.

6 Claims, 1 Drawing Sheet

Acrolein behaviour in aqueous solutions at different pH values

ACROLEIN-RELEASING COPOLYMERS

This application is based upon and claims the benefit of priority of the prior German Patent Application No. 19606495.3 filed on Feb. 22, 1996, U.S. Provisional Application Ser. No. 60/021,828 filed on Jul. 16, 1996 and German Patent Application No. 19653303.1 filed on Dec. 20, 1996 the contents of which are incorporated herein by reference.

FIELD OF THE INVENTION

The invention relates to acrolein-releasing copolymers, the process for the preparation thereof, and to their use as a biocide.

BACKGROUND OF THE INVENTION

It is known to use monomeric acrolein (2-propenal) as a very effective biocide in the treatment of water channels in order to suppress unwanted algae and plant growth. Similarly, it may be used to combat sulphate-reducing bacteria in petroleum exploration.

Until now, no other fields of application have been opened up for the biocidal action of monomeric acrolein in view of its high reactivity. Investigations have shown that acrolein is subject to rapid changes in aqueous systems such as, for example, hydration or polymerisation, depending on the pH (see FIG. 1). Consequently, it has also been impossible hitherto to use acrolein as a preservative with a prolonged effect. Due to its tendency to polymerise spontaneously and possibly in an explosive manner if treated incorrectly, it can be handled only by taking special safety measures. It has a strong irritant effect on the respiratory organs and the eyes. Even in the stabilised form, acrolein may be stored only for a limited period.

It is known to use copolymers of acrolein with formaldehyde, which were prepared by condensation of acrolein and formaldehyde in a molar ratio between 1:1 and 1:10 in the presence of a basic catalyst, as biocides for aqueous systems (DE-B 32 05 487). The known copolymers of acrolein with formaldehyde have the disadvantage that they contain about 15% of free, unreacted formaldehyde.

It is known to use homopolymers of acrolein as biocides (EP-A 0 339 044). Polymerisation is carried out predominantly with radicals. The polyaldehyde structures forming during this process are said to be vehicles of the biocidal action (structural similarity with glutaraldehyde). The formation of free acrolein is not mentioned. The homopolymers of acrolein produced by radical polymerisation have the disadvantage of being insoluble in organic media or in water and, in the form of an aqueous suspension, exhibit only a very low biological activity.

The preparation of polyacroleins described in German patent application P 44 04 404 is problematic because the yields from the reaction of acrolein with NaOH in the aqueous system are only 75–80% of polymer material. Mother liquor and wash water which contain organic substances and must therefore be disposed of at great expense are thus obtained. Recycling is not possible because of the negative effect on the polymer properties. These polymers, too, are virtually insoluble in water.

SUMMARY OF THE INVENTION

Acrolein polymers or copolymers which act as an acrolein depot have not been described hitherto. The monomeric acrolein released continuously in small quantities under suitable conditions was said to act as a biocidal active substance which is formed repeatedly from the polymer or copolymer over a long period.

The object of the present invention was to develop such products and to show a technically simple process for the preparation thereof.

The object was, therefore, to prepare acrolein polymers which have a good biocidal activity and are easy to handle.

The present invention provides acrolein-releasing copolymers prepared from acrolein and one or more polyhydric alcohols, which are characterised by:

Release of monomeric acrolein in aqueous systems, preferably with a pH of >7 and hence a prolonged effect on microorganisms.

The invention also provides a process for the preparation of acrolein-releasing copolymers, which is characterised in that acrolein is added to the polymerisable reaction medium in which the catalyst required for copolymerisation is dissolved, and the temperature of the reaction medium is not allowed to rise above 50° C. The ratio of acrolein to catalyst may lie in the range from 1:0.001 to 1:0.05. The post-agitation time to be maintained after all the acrolein has been introduced may be 0.5–3 h, preferably 1–2 h. If necessary, small residual quantities of monomeric acrolein (conversion normally >99.5%) may be removed by applying a vacuum for a short period. The reaction solution is neutralised by the addition of acid.

The invention provides acrolein polymers which are water-soluble or which become water-soluble or water-dispersible in the presence of an emulsifier and which release monomeric acrolein in an aqueous medium, which polymers are characterised in that acrolein is reacted with a polyhydric alcohol to form said polymers and the alcohol used is incorporated at least proportionally in the polymer structure.

The reaction medium is substantially water-free. Both one or more polyhydric alcohols such as ethane 1,2-diol, propane 1,3-diol, propane 1,2-diol, butane 1,4-diol, glycerol, cyclohexane diols and/or polyethylene glycols may be used as a reaction medium suitable for copolymerisation. Dihydric alcohols of the aliphatic series may be used in preference. The reaction in ethylene glycol or propane 1,2-diol is particularly preferred.

The catalyst used may be compounds from the group comprising alkali- and/or alkaline earth hydrogen sulphites, basic inorganic compounds and/or basic organic compounds. The basic catalyst used may be alkali hydroxides, such as e.g. sodium hydroxide, alkali alcoholates or organic bases such as, for example, piperidine, guanidine, piperazine etc.

Surprisingly, copolymerisation may also be carried out in a weakly acid medium with hydrogen sulphite salts, MeHSO$_3$ (M=Li, Na, K, NH$_4^+$, Rb, Cs) of alkali- and/or alkaline earth metals as catalyst. Completely colourless polymers are obtained in this case.

The colourless or pale yellow-coloured viscous solutions formed by the reaction contain virtually no free acrolein. They are copolymers of acrolein with the solvent.

Using GPC-MALLS analysis (Multi Angle Laser Light Scattering (MALLS), Wyatt MiniDAWN and RI detection after chromatography with tetrahydrofuran on an SDV-5$\mu$-100 Å phase), the average molecular weights determined for the products are 3000–6000 g/mol in a range from 1000–10000 g/mol (see Example 4). The alcohol and water contents may be adjusted in a variable manner by controlling the reaction, and amount to approx. 40–50% in total.

In the case of the copolymer of propylene 1,2-glycol and acrolein, double bonds of the R—CH=CH$_2$ type and aldehyde functions are detected in the $^{13}$C-NMR spectrum (125 MHz, DMSO-d$_6$/303 K) as a broad signal on a very small scale: δ117 (=CH$_2$), δ136 (—CH=) and δ200 (—CHO). In addition, the spectra contain the following structural data: δ16.7/20.1 (—CH$_3$), δ63–77 (OCH$_2$ and OCH groups) and δ90–100 (acetal) The H,C—COSY correlation experiment shows practically no signal intensity for aliphatic CH groups (weak signal at δ43) of the kind expected for a polyacrolein which is polymerised via the double bond.

On the whole, the spectroscopic data are consistent with a polyacrolein having the following structure (y>x≧1):

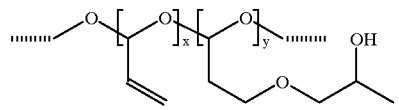

The copolymer obtained has only limited miscibility with water (about 1:1). In the case of relatively high dilutions, milky emulsions are formed from which a part of the copolymer separates on standing as a greasy, viscous liquid. This behaviour makes it difficult to handle the copolymer according to the invention because, for example, containers cannot be cleaned simply by rinsing with water. Surprisingly, it was found that complete miscibility of the copolymer in water is obtained by adding an emulsifier, and, in particular, that even high dilutions do not exhibit any turbidity or Tyndall effects whatsoever, behaving instead as physically true solutions. The emulsifier is usually used in quantities of 0.5–2%, preferably 0.75–1%, based on the total weight of the copolymer solution.

The emulsifier used is preferably alkali salts of sulphosuccinic acid esters having the general formula

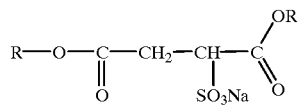

with R=alkyl; C>6

The diethylhexyl ester is particularly preferred.

The addition may take place during or after copolymerisation.

The alcohol:acrolein ratio may vary widely and is often limited by the ease of handling of the solutions which become highly viscous as the acrolein concentration increases. For ethylene glycol or propane 1,2-diol, weight ratios of up to 1:1, that is, 50 wt. % solutions of polymerised acrolein, may be prepared. Higher concentrations have only limited free-flow properties. In preference, reactions are carried out with a ratio of polyhydric alcohols to acrolein of about 1:0.4 to 1:0.7. In order to reduce the viscosity of the products, water may be introduced into the system during the addition of acrolein without precipitation of polymeric acrolein occurring.

The acrolein polymers according to the invention are effective preservatives because of their ability to release acrolein continuously over a long period in aqueous systems, preferably at pH values greater than seven.

The invention also provides a process for the preservation of substances, which is characterised in that the acrolein copolymers according to the invention are added as monomeric acrolein-releasing substances to aqueous systems or aqueous dispersions or suspensions.

For example, the following substances may be preserved with the acrolein copolymers according to the invention:

Plastics dispersions, wall coatings, dye pastes, sealing compounds, distempers, wood preserving paints, adhesive emulsions, skin and leather glues, bone glues, starch glues, casein glues, dextrin adhesives, salted hides, pickling solutions, dry hides, tanning liquors, wet chrome leather, finished leather, spinning baths, wax emulsions, wax raw materials, textile finishing, textile finishes, paper/board, PVC coating, drilling and cutting oils (diluted), drilling and cutting oils (concentrated), wood preservation, cellulose fibres (to prevent rotting), jointing cement, marine paints, liquid cleaning agents.

The acrolein copolymers according to the invention may be added to the substances in quantities of 0.01–0.3%. A particularly preferred embodiment of the invention is the copolymer of acrolein and ethylene glycol or propane 1,2-diol. Due to its good algicidal effect, the former may also be used to control algae growth in cooling circuits.

Moreover, it also controls higher water weeds. The activity is based on the fact that the copolymers according to the invention split off acrolein in the aqueous phase. Cleavage is dependent on the pH of the aqueous solution and on the polyhydric alcohol used. The release of acrolein as a function of time at a pH of 9 is shown by way of the graph in FIG. 2.

BRIEF DESCRIPTION OF THE DRAWINGS

FIG. 2 shows, graphically, acrolein cleavage from a 2% copolymer solution at pH 9.

DETAILED DESCRIPTION OF THE PREFERRED EMBODIMENTS

Examples

Example 1

Figure 1:
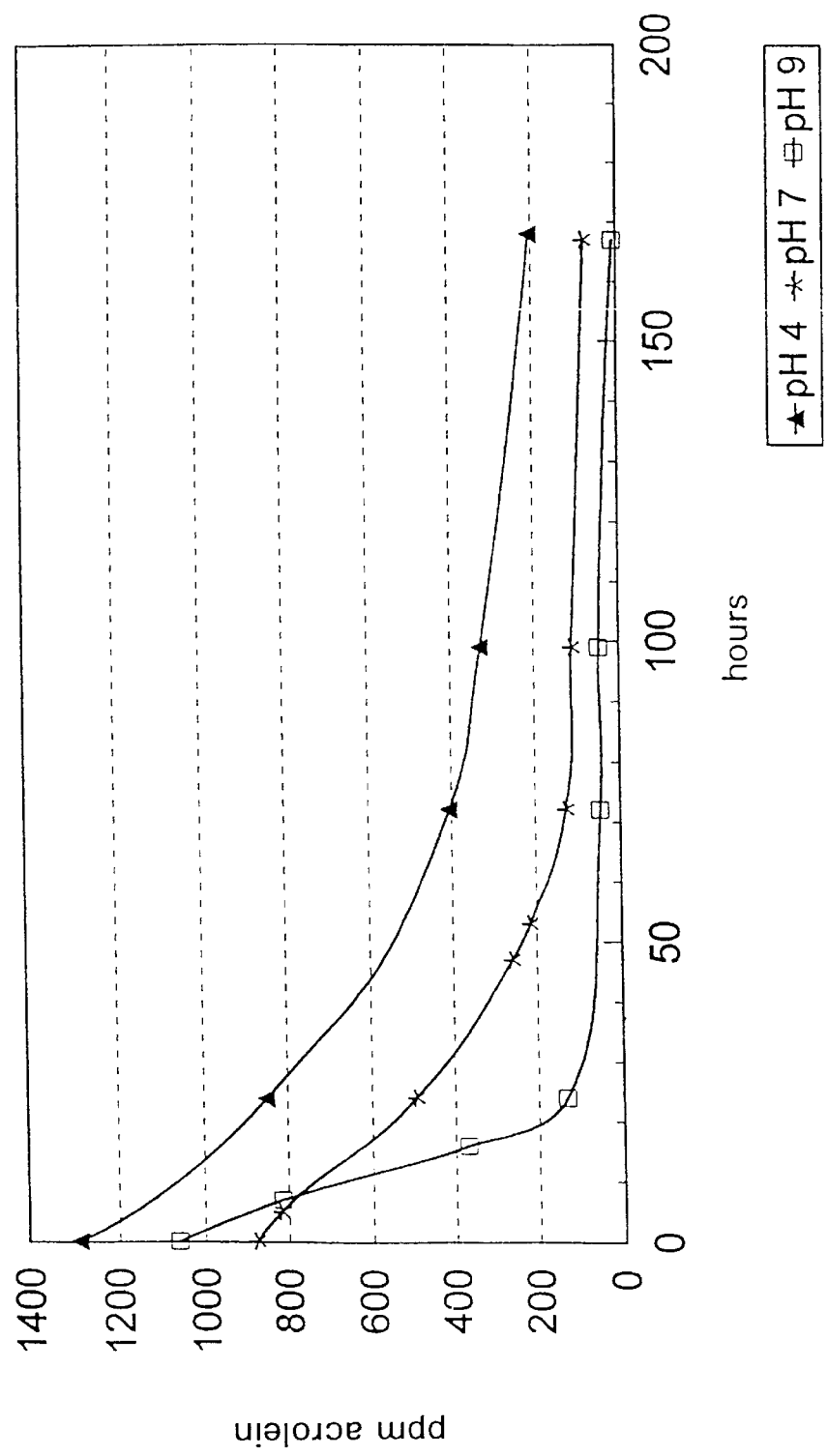
FIG. 1 shows, graphically, acrolein behavior in aqueous solutions at different pH values.

A charge of 270 ml of ethylene glycol and 2.5 ml of 1 N NaOH is prepared. 237 ml of acrolein are added with cooling at 5–25° C. (final temperature). Stirring is continued for 1 h at room temperature and the mixture is neutralised with 2.5 ml of 1 N HCl.

Yield: 500 g of an almost colourless, pale yellow viscous liquid. The unreacted ethylene glycol content is 35% (95 ml). 0.025% of free acrolein was found.

Example 2

The same procedure as described in Example 1 is followed except that piperazine is used as catalyst. A pale yellow liquid with 0.08% of free acrolein is obtained.

Example 3

A charge of 207 ml of ethylene glycol together with 1.0 g of NaHSO$_3$ is prepared. 200 ml of acrolein are added at 20–40° C. Stirring is continued for 3 h. The copolymer is obtained as a viscous, completely clear solution.

Example 4

A charge of 725 ml of propylene 1,2-glycol and 10 ml of 1N NaOH is prepared in a flask and 610 ml of acrolein are added at 10° C. with cooling. The mixture is kept in the temperature range of up to 35° C. and stirring is continued for about 1 h at 40° C. The viscous yellow solution is neutralised by the addition of hydrochloric acid. The residual content of unreacted acrolein is about 0.01%.

The microbicidal action of the preparations prepared is determined with the so-called time-kill test (TKT). In this test carried out in accordance with the recommendations of the American Petroleum Institute (API, RP 38 $2^{nd}$ ed., December 1965), the desired quantity of biocide is added to a highly enriched bacterial suspension (bacterial count $10^6$ to $10^8$) and incubated for 24 hours at 25° C. The suspension is then inactivated and a geometric dilution series to 6 is carried out; 1 ml of each is mixed with 10 ml of nutrient agar on plates and incubated for 48 hours at 37° C. The kill rate is determined from the colony count. The biocide concentration is based on the acrolein content.

Evaluation

The arithmetic mean of 2 values (double determination) is formed. The bacterial reduction count $Br_t$ per unit of time in the TKT (24 hours), also called the evaluation number, is calculated with the equation:

$$Br_t = \log CFU_{(control)} - \log CFU_{(D)}$$

$CFU_{(control)}$ = the number of $CFU/\text{ml}$ without the action of the preparation (also the O sample)

$CFU_{(D)}$ = the number of $CFU/\text{ml}$ after the action of the preparation.

Reductions of at least 5 log stages must be obtained for a good effect.

Type of bacteria: *Pseudomonas aeruginosa* ATCC 15442

| Test no. | Temp. ° C. | pH | Time (h) | Conc. (ppm) | $Br_t$ |
|---|---|---|---|---|---|
| 1 | 25 | 6.5 | 24 | 100 | 4.4 |
| 1 | 25 | 6.5 | 24 | 250 | >7.2 |
| 1 |    | 9   | 24 | 100 | 7.2 |
| 2 | 25 | 6.5 | 24 | 250 | >7.2 |
| 3 | 25 | 6.5 | 24 | 500 | >7.3 |

Test no. 1

| Type of bacteria | Temp. ° C. | pH | Time (h) | conc. (ppm) | $Br_t$ |
|---|---|---|---|---|---|
| *E. coli* | 25 | 6.5 | 24 | 100 | >7.3 |
|           | 25 | 9.0 | 24 | 50  | >7.3 |
| *Staph. aureus* | 25 | 6.5 | 24 | 50 | >7.3 |

-continued

Test no. 1

| Type of bacteria | Temp. ° C. | pH | Time (h) | conc. (ppm) | $Br_t$ |
|---|---|---|---|---|---|
|  | 25 | 9.0 | 24 | 25 | >7.3 |
|  | 25 | 9.0 | 24 | 10 | 4 |

The effectiveness of the copolymers according to the invention as preserving agents may be demonstrated convincingly in a preservative loading test.

Preservative loading test 50 g of an unpreserved, freshly prepared emulsion paint are introduced into a 100 ml polyethylene beaker. The substances to be tested are then weighed out and dispersed homogeneously. An unpreserved paint sample is used as the control.

The sample beakers are stored in a refrigerated incubator for the remaining period at 25° C. and 65% relative humidity.

Three days after the addition of the preservatives, the samples are inoculated with 0.5 ml of a bacterial mixture composed of *Alcaligenes denitrificans, E. coli, Klebsiella pneumoniae, Proteus mirabilis, Proteus vulgaris, Pseudomonas aeruginosa, Pseudomonas putida, Serratia marcescens, Staphylococcus aureus* and stirred in with a spatula. Inoculation is carried out seven times altogether at weekly intervals. After thorough mixing of the sample beakers, smears are made on CASO agar after 3 and after 7 days. Readings of the smears are taken after three days' incubation at 25 to 30° C. in the incubator. Negative smears are observed for another two days for safety's sake, and assessed once again.

The growth is assessed according to the following scheme:

| 0 | no bacteria |
|---|---|
| 0–1 | up to 10 bacteria/CFU |
| 1 | up to 30 bacteria/CFU |
| 2 | up to 100 bacteria/CFU |
| 3 | up to 250 bacteria/CFU |
| 3–4 | up to 500 bacteria/CFU |
| 4 | up to 1000 bacteria/CFU |
| 5 | 85% of the smear covered with growth |
| 6 | smear completely covered; thick growth |

CFU = colony-forming units

| Week/inoculation | 1 | | 2 | | 3 | | 4 | | 5 | | 6 | | 7 | |
|---|---|---|---|---|---|---|---|---|---|---|---|---|---|---|
| Smears | 3d | 7d | 3d | 7d | 3d | 7d | 3d | 7d | 3d | 7d | 3d | 7d | 3d | 7d |
| conc. CFU/ml | $2.7 \times 10^7$ | | $4.2 \times 10^7$ | | $3.7 \times 10^7$ | | $4.0 \times 10^7$ | | $4.0 \times 10^7$ | | $4.0 \times 10^7$ | | $5.9 \times 10^7$ | |
| Date | 14.11.95 | | 21.11.95 | | 28.11.95 | | 05.12.95 | | 12.12.95 | | 19.12.95 | | 03.01.96 | |
| O sample | 3–4 | 2 | 4 | 4 | 6 | 6 | 6 | 6 | 6 | 6 | 6 | 6 | 6 | 6 |
| Polymer from Example 1 0.05% | 0 | 0 | 0 | 0 | 0 | 0 | 0 | 0 | 0 | 0 | 0 | 0 | 0 | 0 |

-continued

| Week/inoculation | 1 | | 2 | | 3 | | 4 | | 5 | | 6 | | 7 | |
|---|---|---|---|---|---|---|---|---|---|---|---|---|---|---|
| Polymer from Example 4 0.05% | 0 | 0 | 0 | 0 | 0 | 0 | 0 | 0 | 0 | 0 | 0 | 0 | 0 | 0 |
| Polymer from Example 1 0.025% | 0 | 0 | 0 | 0 | 0 | 0 | 0 | 0 | 0 | 0 | 0 | 0 | 0 | 0 |
| Polymer from Example 4 0.025% | 0 | 0–1 | 0–1 | 0 | 0–1 | 0 | 0 | 0 | 0–1 | 0 | 0–1 | 0 | 0–1 | 0 |
| Polymer from Example 1 0.01% | 0 | 0–1 | 0–1 | 0 | 0–1 | 0 | 0–1 | 0 | 0–1 | 0 | 0–1 | 0 | 0–1 | 0 |

After 5 months, 6 ppm of free acrolein can be detected by high pressure liquid chromatography in an emulsion paint to which 0.1% has been added.

Acrolein cleavage from product according to Example 1 and Example 4 buffer solutions at pH 9

Solutions used

Example 1: 2% polymer in buffer solution pH 9 from Merck
Example 4: 2% polymer in buffer solution pH 9 from Merck Table of measured values

| Residence time (h) | Acrolein released (ppm) Example 1 | Acrolein released (ppm) Example 4 |
|---|---|---|
| 0 | 216 | 75 |
| 2 | 1416 | 490 |
| 5 | 2035 | 680 |
| 7 | 2190 | 750 |
| 24 | 1773 | 650 |
| 48 | 1354 | 500 |
| 72 | 977 | 462 |
| 100 | 812 | 404 |

These values are shown in a graph in FIG. 2.

What is claimed is:

1. Acrolein-releasing copolymers prepared from acrolein and one or more polyhydric alcohols, wherein said copolymers release monomeric acrolein in aqueous systems for obtaining a prolonged biocidal effect on microorganisms.

2. A process for the preparation of the acrolein-releasing copolymer according to claim 1, comprising adding acrolein to polymerisable reaction medium in which catalyst required for copolymerisation is dissolved, wherein temperature of the reaction medium is not allowed to rise above 50° C.

3. A process for using acrolein-releasing copolymer according to claim 1 as acrolein-releasing compounds in water-containing systems for biocidal purposes, comprising adding the acrolein releasing copolymer to the water-containing systems.

4. A process for preserving substances, comprising adding acrolein-releasing copolymer according to claim 1 to the substances, as a biocide.

5. A process according to claim 2, wherein the polymerisable reaction medium comprises one or more polyhydric alcohols.

6. Acrolein releasing copolymers according to claim 1, wherein the copolymer release monomeric acrolein in aqueous systems with a pH value greater than 7.

* * * * *